(12) United States Patent
Uno et al.

(10) Patent No.: US 12,478,207 B2
(45) Date of Patent: Nov. 25, 2025

(54) STEAM GENERATION DEVICE AND HEATING COOKING APPARATUS

(71) Applicant: SHARP KABUSHIKI KAISHA, Sakai (JP)

(72) Inventors: Masayuki Uno, Sakai (JP); Yoshikazu Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 590 days.

(21) Appl. No.: 17/888,053

(22) Filed: Aug. 15, 2022

(65) Prior Publication Data

US 2023/0119444 A1    Apr. 20, 2023

(30) Foreign Application Priority Data

Oct. 19, 2021    (JP) .................................. 2021-171052

(51) Int. Cl.
*A47J 27/04*    (2006.01)
*F22B 37/78*    (2006.01)

(52) U.S. Cl.
CPC .............. *A47J 27/04* (2013.01); *F22B 37/78* (2013.01); *A47J 2027/043* (2013.01)

(58) Field of Classification Search
CPC ..... A47J 27/04; A47J 2027/043; F22B 37/78; F22B 1/284
USPC ....................................................... 126/348
See application file for complete search history.

(56) References Cited

U.S. PATENT DOCUMENTS

| | | | |
|---|---|---|---|
| 2009/0211314 A1* | 8/2009 | Cho ........................ | D06F 39/40 68/5 C |
| 2010/0021146 A1* | 1/2010 | Murai ....................... | F22B 1/28 392/394 |
| 2010/0058544 A1* | 3/2010 | Park ........................ | D06F 39/40 68/207 |
| 2010/0142935 A1* | 6/2010 | Kim ........................ | D06F 39/40 392/394 |
| 2016/0360916 A1 | 12/2016 | Utsumi et al. | |
| 2018/0328623 A1* | 11/2018 | Giladi ..................... | F24H 1/203 |
| 2019/0063741 A1* | 2/2019 | Landry ................. | G01F 23/296 |
| 2021/0180237 A1* | 6/2021 | Choi ........................ | D06F 34/14 |

FOREIGN PATENT DOCUMENTS

CN    203024822 U    *  6/2013
JP    2016-011776 A    1/2016

* cited by examiner

*Primary Examiner* — Allen R. B. Schult
*Assistant Examiner* — William C Weinert
(74) *Attorney, Agent, or Firm* — ScienBiziP, P.C.

(57) ABSTRACT

The steam generation device includes a steam generation container, a lid portion, and a water level sensor. The steam generation container heats water. The lid portion covers an upper opening portion of the steam generation container. The water level sensor detects a water level in the steam generation container. The water level sensor includes a first electrode rod, a second electrode rod, a bracket, and silicone rubber. The first electrode rod is fixed to the lid portion in a state where the first electrode rod penetrates the lid portion. The bracket is configured integrally with the second electrode rod, inserted into an opening portion provided in the lid portion, and fixed to a peripheral edge portion of the opening portion. The silicone rubber is interposed between the bracket and the lid portion.

5 Claims, 6 Drawing Sheets

STEAM GENERATION DEVICE AND HEATING COOKING APPARATUS

CROSS-REFERENCE TO RELATED APPLICATIONS

This application claims the benefit of priority to Japanese Patent Application Number 2021-171052 filed on Oct. 19, 2021. The entire contents of the above-identified application are hereby incorporated by reference.

BACKGROUND

Technical Field

The present disclosure relates to a steam generation device and a heating cooking apparatus.

For example, JP 2016-11776 A discloses a steam generation device (heating cooking apparatus) including a water level sensor. The water level sensor detects the water level in a steam generation container. The water level sensor includes a first electrode rod and a second electrode rod. The first electrode rod and the second electrode rod are insert-molded into a resin lid portion that covers the steam generation device.

SUMMARY

However, in a steam generation device as disclosed in JP 2016-11776 A, some moisture absorption may be observed in a resin under high temperature and high humidity conditions due to characteristics of a resin used for a lid portion. In addition, a gap may be generated in an insert portion (a portion where a first electrode rod and a second electrode rod are inserted into a lid portion of the steam generation device) due to a difference in thermal expansion coefficient between a metal and a resin. Electrical resistance between the first electrode rod and the second electrode rod (between terminals) fluctuates due to such moisture absorption of a resin, water from the gap generated in the insert portion, or the like, which results in a problem of erroneous detection of a water level by a water level sensor.

Consequently, an object of the present disclosure is to provide a steam generation device and a heating cooking apparatus which can suppress fluctuations in electrical resistance between terminals of a water level sensor due to moisture absorption of a resin, and water from a gap generated in an insert portion.

In order to achieve the above-described object, in the present disclosure, a steam generation device includes a steam generation container, a lid portion, and a water level sensor. The steam generation container heats water. The lid portion covers an upper opening portion of the steam generation container. The water level sensor detects a water level in the steam generation container. In addition, the water level sensor includes a first electrode rod, a second electrode rod, a bracket, and an interposition component. The first electrode rod is fixed to the lid portion in a state where the first electrode rod penetrates the lid portion. The bracket is configured integrally with the second electrode rod, inserted into an opening portion provided in the lid portion, and fixed to a peripheral edge portion of the opening portion. The interposition component is interposed between the bracket and the lid portion.

As described above, according to the present disclosure, a second electrode rod out of a first electrode rod and the second electrode rod of a water level sensor is held through an interposition component to be electrically insulated from a lid portion, and thus it makes it possible to suppress fluctuations in electrical resistance between terminals of the water level sensor due to moisture absorption of a resin, water from a gap generated in an insert portion, or the like.

BRIEF DESCRIPTION OF DRAWINGS

The disclosure will be described with reference to the accompanying drawings, wherein like numbers reference like elements.

DESCRIPTION OF EMBODIMENTS

Hereinafter, a steam generation device and a heating cooking apparatus including the steam generation device in an embodiment of the present disclosure will be described with reference to the drawings.

Figure 1:
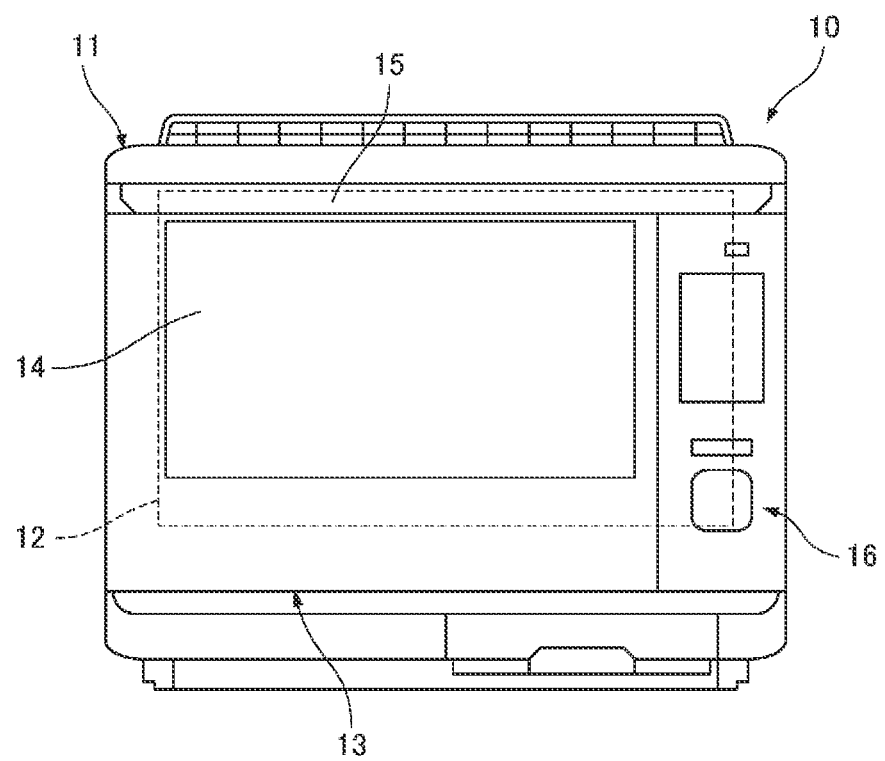
FIG. 1 is a schematic front view of a heating cooking apparatus including a steam generation device in an embodiment.
Figure 2:
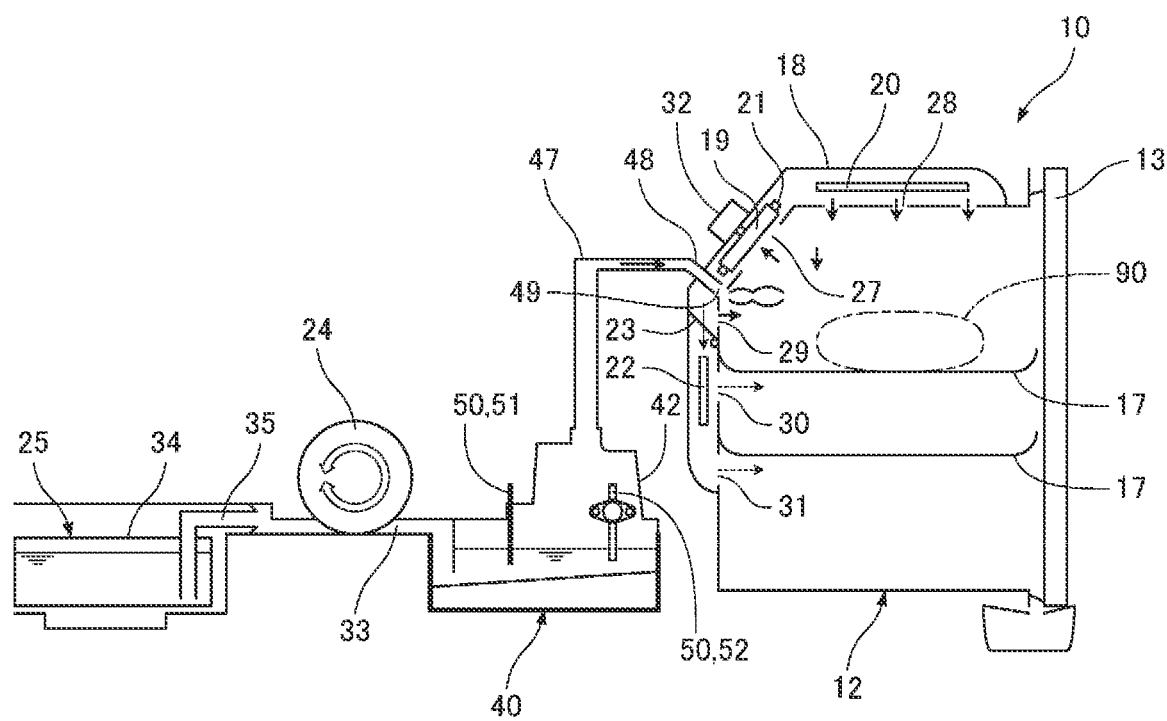
FIG. 2 is a schematic view illustrating a configuration of the main portion of the heating cooking apparatus including the steam generation device in the embodiment.

First, a heating cooking apparatus 10 including a steam generation device 40 will be described. FIG. 1 is a schematic front view of the heating cooking apparatus 10 including the steam generation device 40 in the embodiment. FIG. 2 is a schematic view illustrating a configuration of the main portion of the heating cooking apparatus 10 including the steam generation device 40 in the embodiment.

As illustrated in FIG. 1 and FIG. 2, the heating cooking apparatus 10 including the steam generation device 40 in the embodiment includes a body casing 11 having a rectangular parallelepiped shape, a heating chamber 12 provided in the body casing 11, and a door 13 that opens and closes on the front side of the heating chamber 12.

The door 13 is attached to be rotatable around a lower side as an axis on the front face side of the body casing 11. A transparent outer glass 14 having heat resistance is provided on the front surface of the door 13. The door 13 has a handle 15 positioned above the outer glass 14 and an operation panel 16 provided on the right side of the outer glass 14.

Steam from the steam generation device 40 is supplied to the heating chamber 12. The heating chamber 12 accommodates a heating target object 90. One or more cooking trays 17 in the heating chamber 12 are configured to be able to be taken in and out.

As illustrated in FIG. 2, the heating cooking apparatus 10 includes a circulation duct 18, a circulation fan 19, an upper heater 20, an intermediate heater 21, a lower heater 22, a circulation damper 23, a tube pump 24, a feed water tank 25, the steam generation device 40, and a water level sensor 50.

The circulation duct 18 communicates with the inside of the heating chamber 12 through a blow-in port 27, an upper blow-out port 28, and rear blow-out ports 29, 30, and 31.

The circulation fan 19 is a centrifugal fan and is driven by a circulation fan motor 32. When the circulation fan motor 32 drives the circulation fan 19, air or saturated steam in the heating chamber 12 is suctioned into the circulation duct 18 from the blow-in port 27 and flows outward in the radial direction of the circulation fan 19.

The upper heater 20, the intermediate heater 21, and the lower heater 22 are constituted by, for example, a sheathed heater. The upper heater 20 is disposed in the circulation duct 18 and heats air or the like flowing to the upper blow-out port 28. The intermediate heater 21 is formed in an annular shape to surround the circulation fan 19, and heats air and the like directed to the upper heater 20 from the circulation fan 19, and air and the like directed to the lower heater 22 from the circulation fan 19. The lower heater 22 is disposed within the circulation duct 18, and heats air and the like flowing into the rear blow-out ports 30 and 31.

The circulation damper 23 is rotatably provided in the circulation duct 18 and between the intermediate heater 21 and the lower heater 22.

The tube pump 24 is a pump which can switch between a water supply operation and a water discharge operation in accordance with a driving direction. The tube pump 24 moves an elastically deformable water supply and discharge tube 33 made of silicone rubber or the like while strongly pressing it with a roller (not illustrated), not illustrated in the drawing, to make water in the feed water tank 25 flow to the steam generation device 40 and to make water in the steam generation device 40 flow to the feed water tank 25.

The feed water tank 25 includes a feed water tank body 34 and a communication pipe 35. In the feed water tank 25, one end portion of the communication pipe 35 is positioned in the feed water tank body 34, while the other end portion of the communication pipe 35 is positioned outside the feed water tank 25. In the feed water tank 25, the inside of the feed water tank body 34 communicates with the inside of the steam generation device 40 through the communication pipe 35 or the like.

Figure 3:
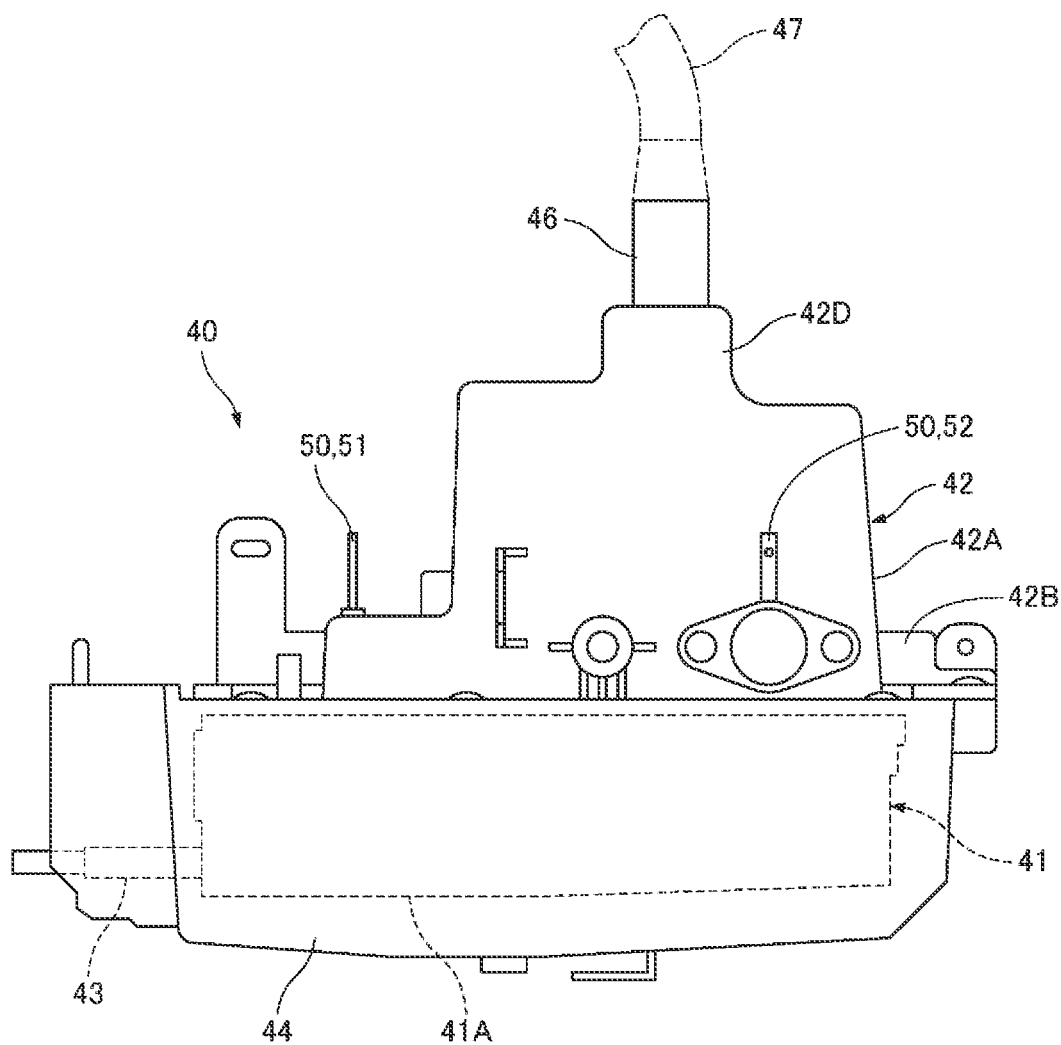
FIG. 3 is a front view of the steam generation device in the embodiment.
Figure 4:
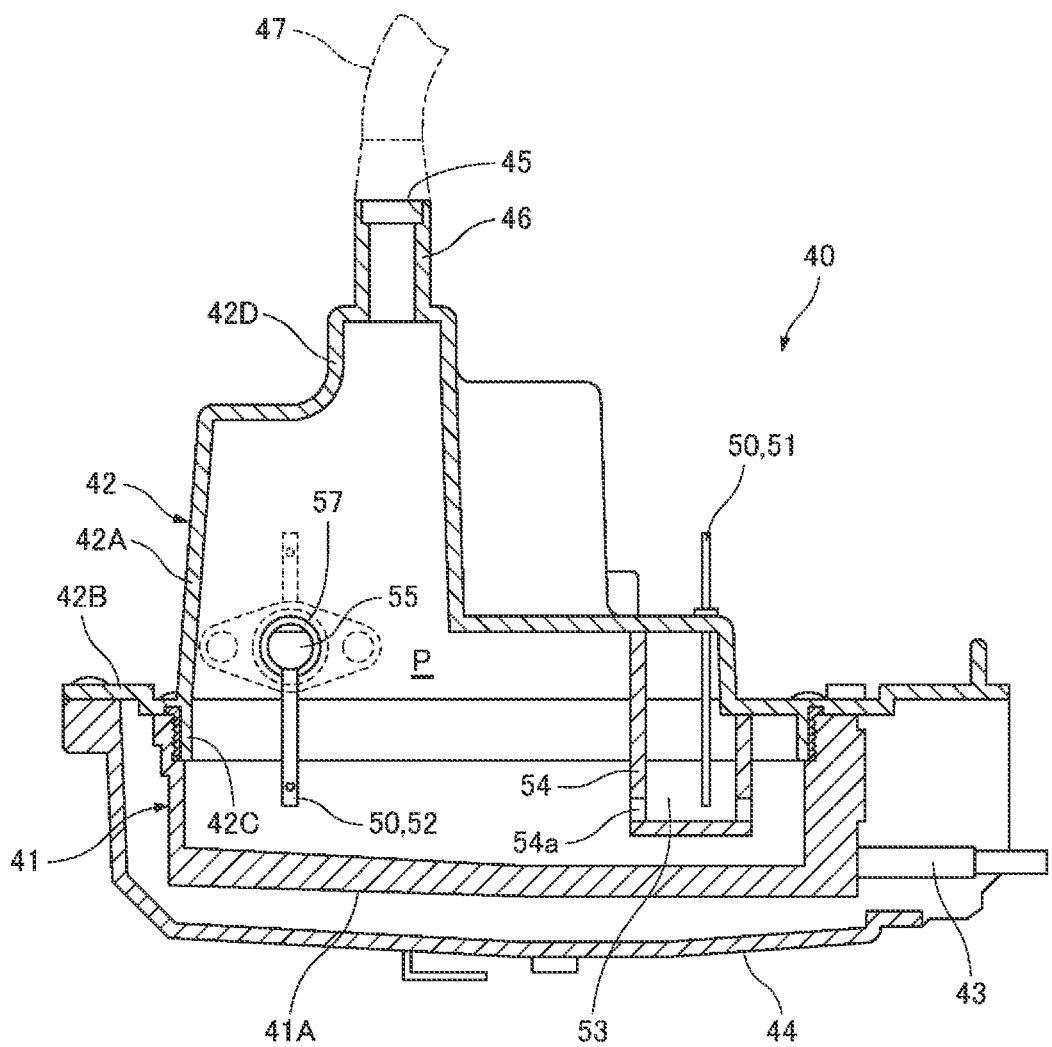
FIG. 4 is a rear face side cross-sectional view of the steam generation device in the embodiment.
Figure 5:
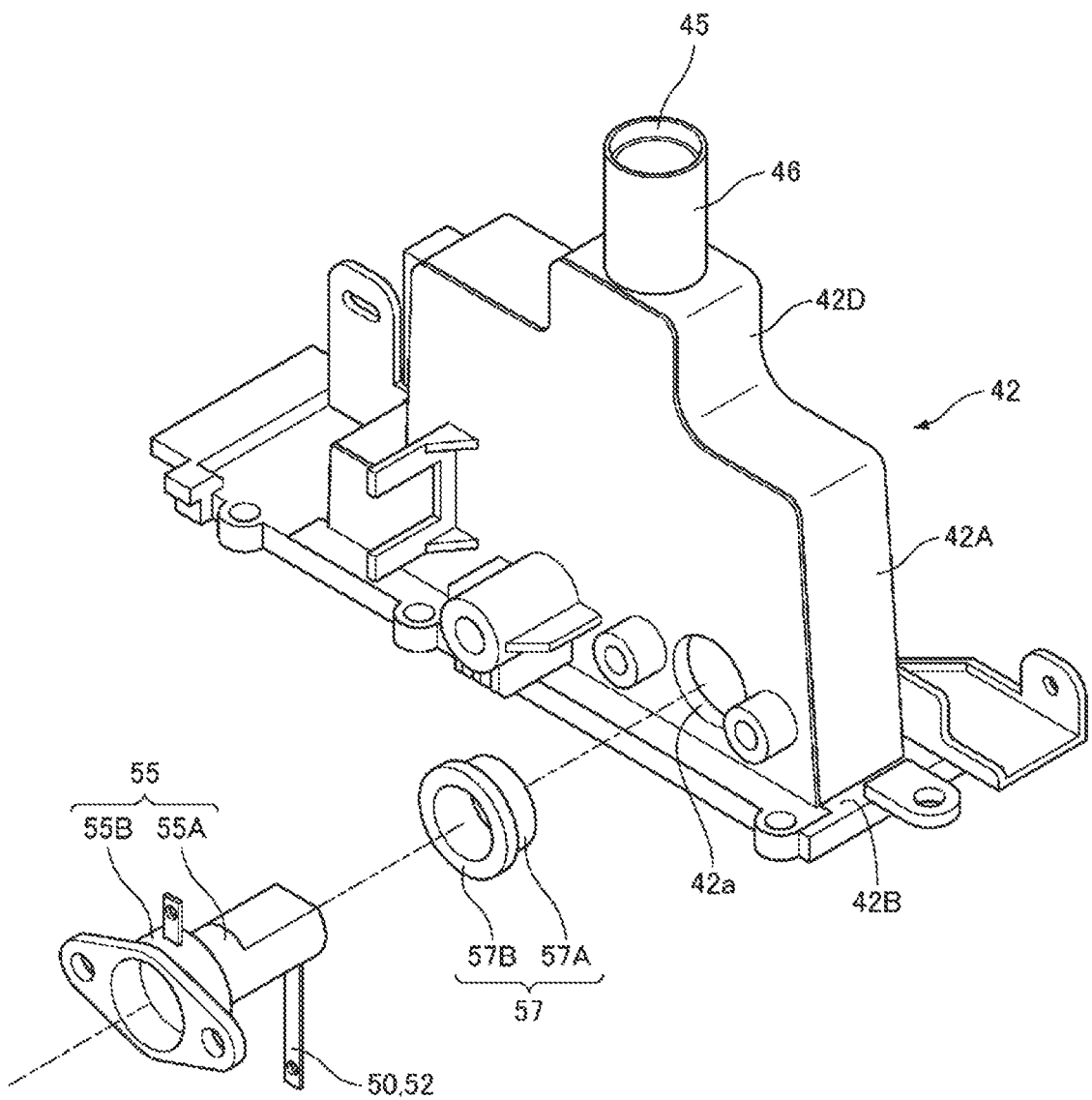
FIG. 5 is an upper perspective view of a lid portion before a second electrode rod of the steam generation device in the embodiment is attached to the lid portion.
Figure 6:
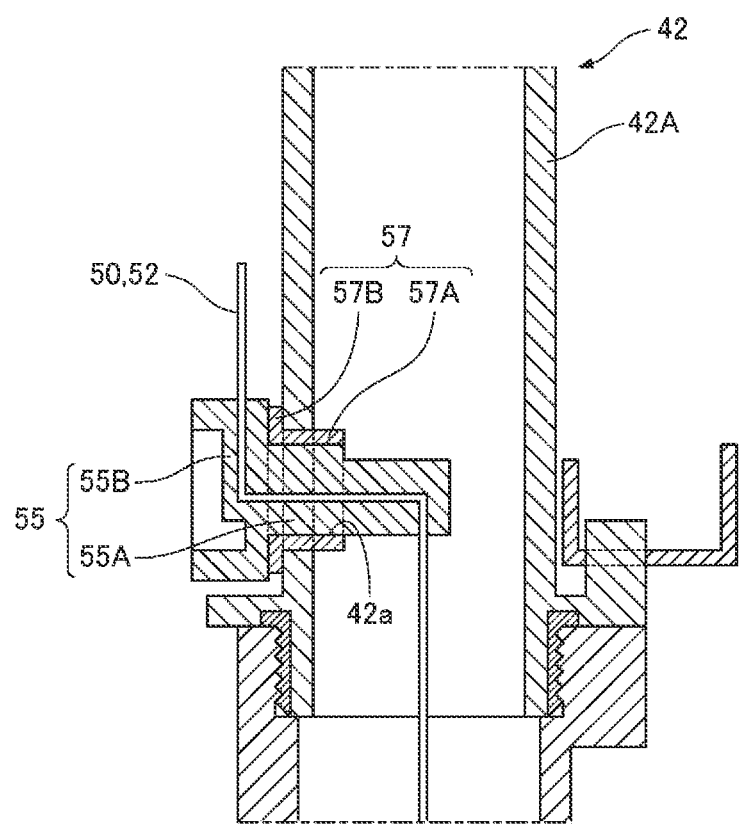
FIG. 6 is a cross-sectional view of the vicinity of the second electrode rod when the second electrode rod of the steam generation device in the embodiment is attached to the lid portion.

Next, the steam generation device 40 will be described. FIG. 3 is a front view of the steam generation device 40 in the embodiment. FIG. 4 is a rear face side cross-sectional view of the steam generation device 40 in the embodiment. FIG. 5 is an upper perspective view of a lid portion 42 before a second electrode rod 52 of the steam generation device 40 in the embodiment is attached to the lid portion 42. FIG. 6 is a cross-sectional view of the vicinity of the second electrode rod 52 when the second electrode rod 52 of the steam generation device 40 in the embodiment is attached to the lid portion 42.

As illustrated in FIG. 3 and FIG. 4, the steam generation device 40 includes a steam generation container 41, the lid portion 42, a steam generation heater 43, and a heat insulating cover 44.

The steam generation container 41 is a container made of a metal (for example, an aluminum alloy or the like) having a rectangular shape when seen in a plan view, the steam generation container having an upper opening. The steam generation container 41 is a container for heating water. Water from the feed water tank 25 is stored in the steam generation container 41.

The lid portion 42 covers the upper opening of the steam generation container 41. The lid portion 42 covers the upper opening of the steam generation container 41 to form a steam generation space P together with the steam generation container 41. The lid portion 42 is formed of a heat-resistant resin (for example, a polyphenylene sulfide (PPS) resin). The lid portion 42 includes a body 42A, a flange portion 42B provided at a lower end of the body 42A, and an insertion portion 42C extending downward from a lower surface of the flange portion 42B. The body 42A, the flange portion 42B, and the insertion portion 42C are integrally formed of a heat-resistant resin.

A protrusion portion 42D is provided on the upper side of the body 42A of the lid portion 42. A steam blow-out port connection portion 46 having a steam blow-out port 45 is provided at a tip end of the protrusion portion 42D. The steam blow-out port connection portion 46 (steam blow-out port 45) is a portion where saturated steam generated by heating of the steam generation heater 43 is blown out. One end of the steam tube 47 is connected to the steam blow-out port connection portion 46.

The steam tube 47 is formed of a resin. A metal steam tube 48 (FIG. 2) is connected to the other end of the steam tube 47. The steam tube 48 is connected to a steam supply port 49 (FIG. 2) provided in the heating chamber 12.

The steam generation heater 43 is constituted by a sheathed heater molded into a bottom portion 41A of the steam generation container 41. The steam generation heater 43 is embedded to extend from one side to the other side of the bottom portion 41A of the steam generation container 41 in the longitudinal direction. The steam generation heater 43 heats water stored in the steam generation container 41. Saturated steam generated by heating of the steam generation heater 43 flows through the steam tube 47 and the steam tube 48 and is supplied to the heating chamber 12 through the steam supply port 49.

The heat insulating cover 44 is formed to cover the steam generation container 41 and to be spaced apart from the steam generation container 41. The heat insulating cover 44 is formed of, for example, a heat-resistant resin such as a PPS resin. The heat insulating cover 44 is fixed to the flange portion 42B of the lid portion 42.

The water level sensor 50 including a first electrode rod 51 and a second electrode rod 52 and detecting the water level in the steam generation container 41 is attached to the lid portion 42. In the steam generation container 41, it is determined whether the water level of the steam generation container 41 reaches a predetermined water level, based on whether the first electrode rod 51 and the second electrode rod 52 are in an electrically conductive state.

The first electrode rod 51 and the second electrode rod 52 are disposed on both sides with the steam blow-out port 45 interposed therebetween, the steam blow-out port 45 being provided in the protrusion portion 42D of the lid portion 42. The first electrode rod 51 and the second electrode rod 52 are disposed on both sides with the steam blow-out port 45 interposed therebetween to increase a distance between the first electrode rod 51 and the second electrode rod 52 (a distance between terminals). For this reason, electrical resistance between the first electrode rod 51 and the second electrode rod 52 (between terminals) can be stabilized.

The first electrode rod 51 is fixed to the lid portion 42 in a state where the first electrode rod 51 penetrates the lid portion 42 from above the lid portion 42. More specifically, the first electrode rod 51 is integrally formed with the lid portion 42 (the body 42A) formed of a resin by insert molding and is fixed to the lid portion 42.

A detection tip end side (a side in contact with water) of the first electrode rod 51 is accommodated in a water level detection chamber 53. The water level detection chamber 53 is formed by a water level detection chamber cover 54. That is, the first electrode rod 51 is disposed in the water level detection chamber cover 54 that forms the water level detection chamber 53 so as to surround the first electrode rod 51. The water level detection chamber cover 54 is provided in a steam generation space P formed by the steam generation container 41 and the lid portion 42. By forming the water level detection chamber 53 so as to surround the first electrode rod 51 by the water level detection chamber cover 54 provided in the steam generation space P, even when water in the steam generation container 41 boils and a water surface is foamed, the water level detection chamber 53 is less affected, and the water level is stable. For this reason, the first electrode rod 51 can accurately detect the water level in the steam generation container 41. A through hole 54a is provided at the bottom of the water level detection chamber cover 54. The through hole 54a is a water infiltration hole. By providing the through hole 54a at the bottom of the water level detection chamber cover 54, water can be taken in and out of the water level detection chamber 53. For this reason, the water level in the water level detection chamber 53 can be kept equivalent to the water level in the steam generation container 41.

As illustrated in FIG. 5 and FIG. 6, the second electrode rod 52 is integrally configured with a bracket 55 formed of resin. More specifically, the second electrode rod 52 is formed integrally with the bracket 55 formed of a resin by insert molding in a state in which a plurality of positions of the second electrode rods 52 are folded in a substantially Z shape.

The bracket 55 includes an insertion portion 55A inserted into an opening portion 42a of the body 42A of the lid portion 42, and a flange portion 55B that is able to abut on the side surface of the body 42A. In the bracket 55, the insertion portion 55A is inserted into a peripheral edge portion of the opening portion 42a, and the flange portion 55B is screwed to be fixed to the peripheral edge portion of the opening portion 42a of the lid portion 42. Note that the fixing of the bracket 55 to the lid portion 42 is not limited to screwing, and the bracket 55 may be fixed to the lid portion 42 by welding or adhesion. The second electrode rod 52 is inserted into the center portions of the insertion portion 55A and the flange portion 55B. In the insertion portion 55A, a detection tip end portion (an end portion on a side where the second electrode rod 52 is in contact with water) of the second electrode rod 52 protrudes from a tip end portion on a side where the insertion portion 55A is inserted into the lid portion 42. In the flange portion 55B, a detection base end portion of the second electrode rod 52 protrudes from the upper portion of the flange portion 55B.

The second electrode rod 52 is disposed outside the water level detection chamber 53 so that a distance between the second electrode rod 52 and the first electrode rod 51 (a distance between terminals) increases. That is, the second electrode rod 52 is disposed outside the water level detection chamber cover 54 that forms the water level detection chamber 53. More specifically, in the second electrode rod 52, a separate component (the bracket 55) having the second electrode rod 52 inserted thereinto is fixed to the lid portion 42 by being inserted into the opening portion 42a provided in the lid portion 42 and fixed to a peripheral edge portion of the opening portion 42a.

The opening portion 42a into which the bracket 55 is inserted and the second electrode rod 52 is fixed is provided to be open in a circular shape on the side surface of the lid portion 42. The opening portion 42a is provided at a position where the second electrode rod 52 can be attached to the lid portion 42 so that the length of the terminal of the second electrode rod 52 fixed to the lid portion 42 (the length of the terminal on the detection tip end side) is shortened, the position being the side surface of the body 42A of the lid portion 42. By providing the opening portion 42a at such a position, the length of the terminal of the second electrode rod 52 fixed to the lid portion 42 (the length of the terminal on the detection tip end side) becomes shorter than that in a case where the opening portion 42a is provided in the upper portion of the lid portion 42, thereby making it possible to prevent a defect that the terminal of the second electrode rod 52 on the detection tip end side is bent.

Further, the opening portion 42a is provided on one side with the steam blow-out port 45 provided in the lid portion 42 sandwiched therebetween (a side opposite to the side where the water level detection chamber 53 is provided). That is, the opening portion 42a is provided at a position separated from the water level detection chamber 53 (the water level detection chamber cover 54) provided with the first electrode rod 51. In this manner, the opening portion 42a is provided at a position separated from the water level detection chamber 53 provided with the first electrode rod 51, and thus the second electrode rod 52 can be provided at a position separated from the first electrode rod 51. For this reason, it makes it possible to increase a distance between the first electrode rod 51 and the second electrode rod 52 (a distance between terminals) and stabilize electrical resistance between the first electrode rod 51 and the second electrode rod 52 (between terminals).

When the second electrode rod 52 is fixed to the lid portion 42, a silicone rubber 57 (an example of an interposition component") is attached between the bracket 55 and the lid portion 42. The silicone rubber 57 is a member having heat resistance, water resistance, and elasticity. The silicone rubber 57 is formed in an annular shape. The silicone rubber 57 is formed such that the bracket 55 can be inserted into the center portion thereof and the silicone rubber 57 can be fitted into the opening portion 42a of the lid portion 42.

The silicone rubber 57 includes a fitting portion 57A that is fitted into the opening portion 42a of the body 42A of the lid portion 42, and a flange portion 57B that abuts on the side surface of the body 42A. A hole portion through which the insertion portion 55A of the bracket 55 is inserted is formed in the center portions of the fitting portion 57A and the flange portion 57B. The fitting portion 57A blocks a gap between the insertion portion 55A of the bracket 55 and the peripheral edge portion of the opening portion 42a of the lid portion 42 when the silicone rubber 57 is interposed between the bracket 55 and the lid portion 42. The flange portion 57B blocks a gap between the flange portion 55B of the bracket 55 and the side surface of the body 42A of the lid portion 42 when the silicone rubber 57 is interposed between the bracket 55 and the lid portion 42. In this manner, when the second electrode rod 52 is fixed to the lid portion 42, the silicone rubber 57 is interposed between the bracket 55 and the lid portion 42, and thus it makes it possible to electrically isolate the second electrode rod 52 and the lid portion 42 (the body 42A) from each other and to suppress fluctuations in electrical resistance between terminals (between the first electrode rod 51 and the second electrode rod 52) due to moisture absorption of the lid portion 42 (the body 42A) formed of a resin, water from a gap generated between the bracket 55 and the lid portion 42 (the body 42A), or the like.

As described above, according to the embodiment of the present disclosure, at least one location (the second electrode rod 52) of the terminals (the first electrode rod 51 and the second electrode rod 52) of the water level sensor 50 is held through the silicone rubber 57 to be electrically insulated from the lid portion 42 (the body 42A), and thus to suppress fluctuations in electrical resistance between terminals (between the first electrode rod 51 and the second electrode rod 52) of the water level sensor 50, due to moisture absorption of the lid portion 42 (the body 42A) formed of a resin, water from a gap generated between the bracket 55 and the lid portion 42 (the body 42A), or the like.

According to the embodiment of the present disclosure, a distance between the first electrode rod 51 and the second electrode rod 52 (a distance between terminals) is increased by independently attaching a separate component (the bracket 55) having the second electrode rod 52 insert-molded therein to a position separated from the first electrode rod 51, and thus electrical resistance between the first electrode rod 51 and the second electrode rod 52 (between terminals) can be stabilized.

Note that, in the embodiment of the present disclosure, the bracket 55 having the second electrode rod 52 insert-molded therein is attached to the side surface of the body 42A of the lid portion 42. However, the present disclosure is not limited thereto, and the bracket 55 may be attached to, for example, the upper surface of the body 42A of the lid portion 42 as long as the bracket 55 can be attached to a position where the silicone rubber 57 is interposed between the bracket 55 and the lid portion 42.

In the embodiment of the present disclosure, the first electrode rod 51 and the second electrode rod 52 are disposed on both sides with the steam blow-out port 45 provided in the lid portion 42 interposed therebetween. However, the present disclosure is not limited thereto, and for example, the first electrode rod 51 and the second electrode rod 52 may be disposed in the water level detection chamber 53 as long as the second electrode rod 52 is fixed to the lid portion 42 by interposing the silicone rubber 57 (an interposition component) between the bracket 55 and the lid portion 42.

In the embodiment of the present disclosure, the silicone rubber 57 is used as an interposition component interposed between the bracket 55 and the lid portion 42. However, the present disclosure is not limited thereto, and any member formed of a material having heat resistance, water resistance, and elasticity may be used.

In the embodiment of the present disclosure, the water level detection chamber cover 54 is provided in the lid portion 42. However, the present disclosure is not limited thereto, and the water level detection chamber cover 54 may not be provided in the lid portion 42.

In the embodiment of the present disclosure, the water level detection chamber cover 54 is provided only in the first electrode rod 51. However, the present disclosure is not limited thereto, and a separate water level detection chamber cover 54 may be provided in each of the first electrode rod 51 and the second electrode rod 52. In addition, the water level detection chamber cover 54 may be provided only in the second electrode rod 52.

The embodiments of the present disclosure have been described above with reference to the drawings. However, the present disclosure is not limited to the embodiments described above, and the present disclosure can be implemented in various modes without departing from the gist thereof. For ease of understanding, the drawings schematically illustrate each component as a main constituent, and the thickness, length, number, spacing, and the like of each component illustrated are different from the actual thickness, length, number, spacing for convenience of drawing preparation. Further, the material, shape, dimensions, and the like of each component described in the embodiment described above are examples and are not particularly limited, and various modifications can be made within a range that does not substantially deviate from the configuration of the present disclosure.

INDUSTRIAL APPLICABILITY

According to the present disclosure, fluctuations in electrical resistance between terminals of a water level sensor that detects the water level in a steam generation container can be suppressed. Thus, the industrial applicability of the present disclosure is great.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A steam generation device comprising:
a steam generation container configured to heat water;
a lid portion covering an upper opening portion of the steam generation container; and
a water level sensor configured to detect a water level in the steam generation container,
wherein the water level sensor includes:
a first electrode rod fixed to the lid portion in a state that the first electrode rod penetrates the lid portion,
a second electrode rod,
a bracket configured integrally with the second electrode rod, inserted into an opening portion provided in the lid portion, and fixed to a peripheral edge portion of the opening portion, and
an interposition component interposed between the bracket and the lid portion, and wherein the opening portion in which the second electrode rod is fixed is provided on a side surface of the lid portion other than a top surface of the lid portion and other than a surface on which the first electrode rod is fixed.
2. The steam generation device according to claim 1, wherein the steam generation container includes a surrounding space and an open space,
the first electrode rod is disposed in a water level detection chamber cover that forms a water level detection chamber in the surrounding space, and
the second electrode rod is not surrounded by the water level detection chamber cover and is disposed in the open space.
3. The steam generation device according to claim 1, wherein the interposition component is formed of silicone rubber.
4. A heating cooking apparatus comprising:
the steam generation device according to claim 1; and
a heating chamber to which steam from the steam generation device is supplied.
5. The steam generation device according to claim 2, wherein a through hole is provided near a bottom of the water level detection chamber cover.

* * * * *